United States Patent [19]

Miyazaki

[11] Patent Number: 5,031,231
[45] Date of Patent: Jul. 9, 1991

[54] MOBILE TELEPHONE STATION WITH POWER SAVING CIRCUIT

[75] Inventor: Shinichi Miyazaki, Tokyo, Japan

[73] Assignee: NEC Corporation, Tokyo, Japan

[21] Appl. No.: 412,378

[22] Filed: Sep. 26, 1989

[30] Foreign Application Priority Data

Sep. 26, 1988 [JP] Japan .................................. 63-241486

[51] Int. Cl.⁵ .............................................. H04B 1/16
[52] U.S. Cl. ..................................... 455/54; 455/127; 455/343
[58] Field of Search ............... 455/127, 343, 54, 89, 455/76; 379/58-60, 63

[56] References Cited

U.S. PATENT DOCUMENTS

| | | | |
|---|---|---|---|
| 4,723,304 | 2/1988 | Maeda | 455/127 |
| 4,726,020 | 2/1988 | Firo et al. | 455/127 |
| 4,852,148 | 7/1989 | Shibata et al. | 455/127 |

OTHER PUBLICATIONS

"Nordic Mobile Telephone System Specification", NMT Doc 900-1, pp. 10-45.

Primary Examiner—Curtis Kuntz
Attorney, Agent, or Firm—Sughrue, Mion, Zinn, Macpeak & Seas

[57] ABSTRACT

A mobile station comprises a receiver for receiving a signal from the base station and a transmitter including a frequency synthesizer, a modulator and a power amplifier connected to it. For power savings purposes, the transmitter is deactivated during a standby mode. If an earlier portion of a signal received from the base station indicates a likelihood of a need to return an acknowledgment, power is supplied to the frequency synthesizer to allow it to stabilize in advance. If a later portion of the received signal indicates that there actually exists the need to acknowledge the receipt of the signal, the power amplifier is subsequently activated and an acknowledgment signal is returned through it to the base station. If the later portion of the received signal indeicates the absence of the need to acknowledge, the frequency synthesizer is again deactivated and the power amplifier remains deactivated.

4 Claims, 3 Drawing Sheets

MOBILE TELEPHONE STATION WITH POWER SAVING CIRCUIT

BACKGROUND OF THE INVENTION

The present invention relates generally to mobile telephone systems, and more specifically to a technique for saving the power consumption of the mobile stations of the system.

A known mobile telephone station served by a system such as Nordic Mobile Telephone System (NMT-450) is so designed that during a standby period the transmitter of the mobile station is always activated in readiness to return an acknowledgment signal within the specified period of 30 milliseconds in response to a calling signal from the base station. This is due to the fact that the specified response time is smaller than the time it would take to stabilize the mobile transmitter from an inactive state. However, it has been desired to cut off power supplies to the transmitter, i.e., the power consuming unit of the mobile station, during standby periods for power savings purposes.

SUMMARY OF THE INVENTION

It is therefore an object of the present invention to provide a mobile telephone station with a power saving circuit for a system that elicits an acknowledgment response within a period of time smaller than the warm-up time of a power consuming transmit unit.

According to the present invention, the mobile station comprises a receiver for receiving a signal from the base station and a transmitter. A control circuit deactivates the transmitter during a standby mode in order to save power, and determines from an earlier portion of a signal received from the base station that there is a likelihood of a need to return an acknowledgment and then supplies power to the transmitter to warm it up in advance and proceeds to determine from a later portion of the received signal whether the need for the acknowledgment actually exists or not. If the determination from the later portion indicates that the need actually exists for returning an acknowledgment, the control circuit causes it to be transmitted through the activated transmitter and if the determination from the later portion indicates the absence of the need, the control circuit deactivates the transmitter again.

In a more specific aspect, the transmitter comprises a frequency synthesizer for generating a carrier, a modulator for modulating the carrier with a signal to be transmitted to the base station, and a power amplifier for amplifying the modulated carrier for transmission to the base station. The frequency synthesizer has a warm-up time longer than the response time specified by the base station. The control circuit supplies power to the frequency synthesizer when the determination from the earlier portion of a received signal indicates the presence of the likelihood of returning an acknowledgment, and then supplies power to the power amplifier if the determination from the later portion indicates the presence of the actual need to acknowledge the receipt of the signal and deactivates the frequency synthesizer if the determination from the later portion indicates the absence of the need to acknowledge. In practical aspect, the earlier and later portions of the received signal are earlier and last digits, respectively, of a subscriber identification number assigned to the mobile station.

BRIEF DESCRIPTION OF THE DRAWINGS

The present invention will be described in further detial with reference to the accompanying drawings, in which.

DETAILED DESCRIPTION

Figure 1:
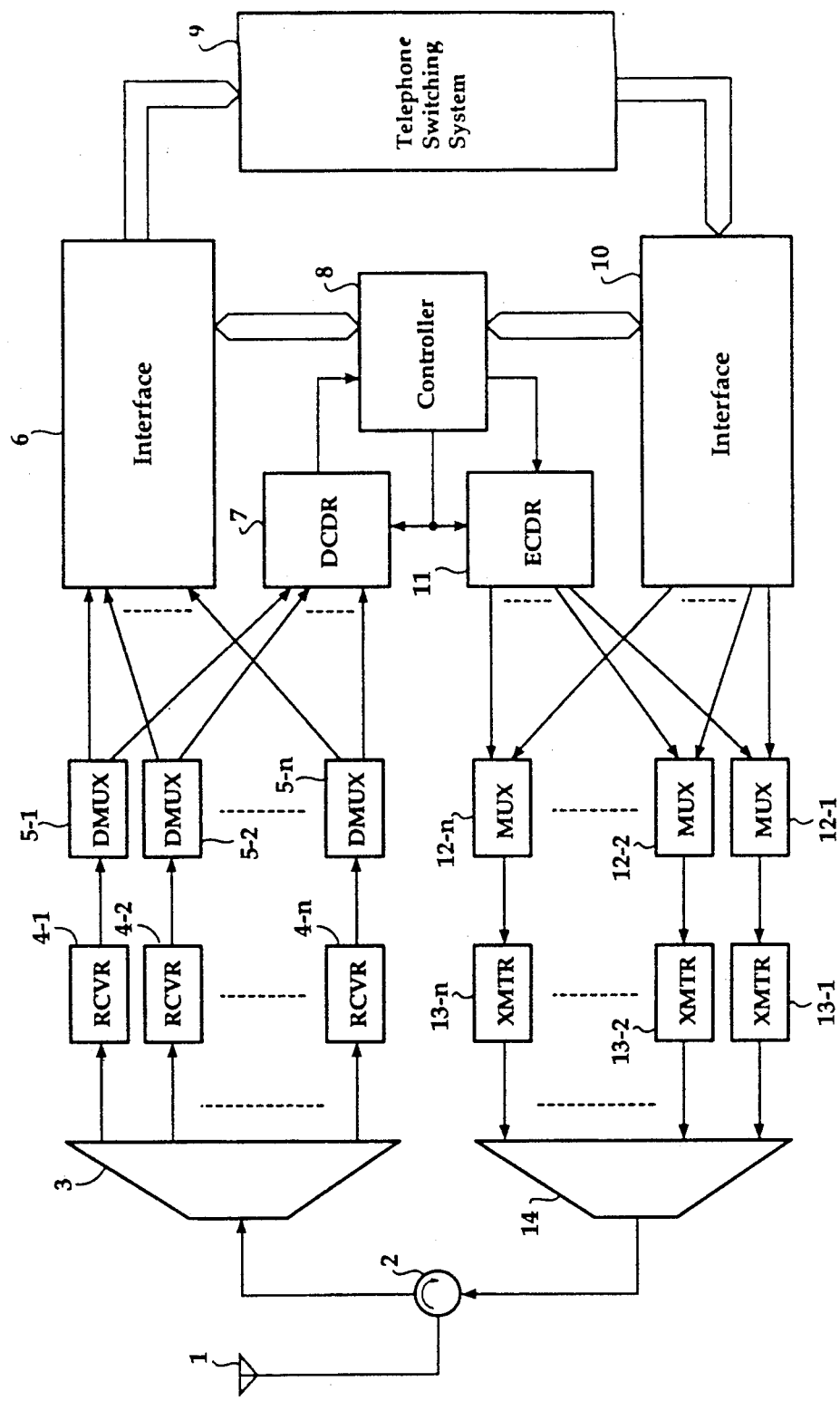
FIG. 1 is a block diagram of a base station of a mobile telephone system embodying the present invention.
Figure 2:
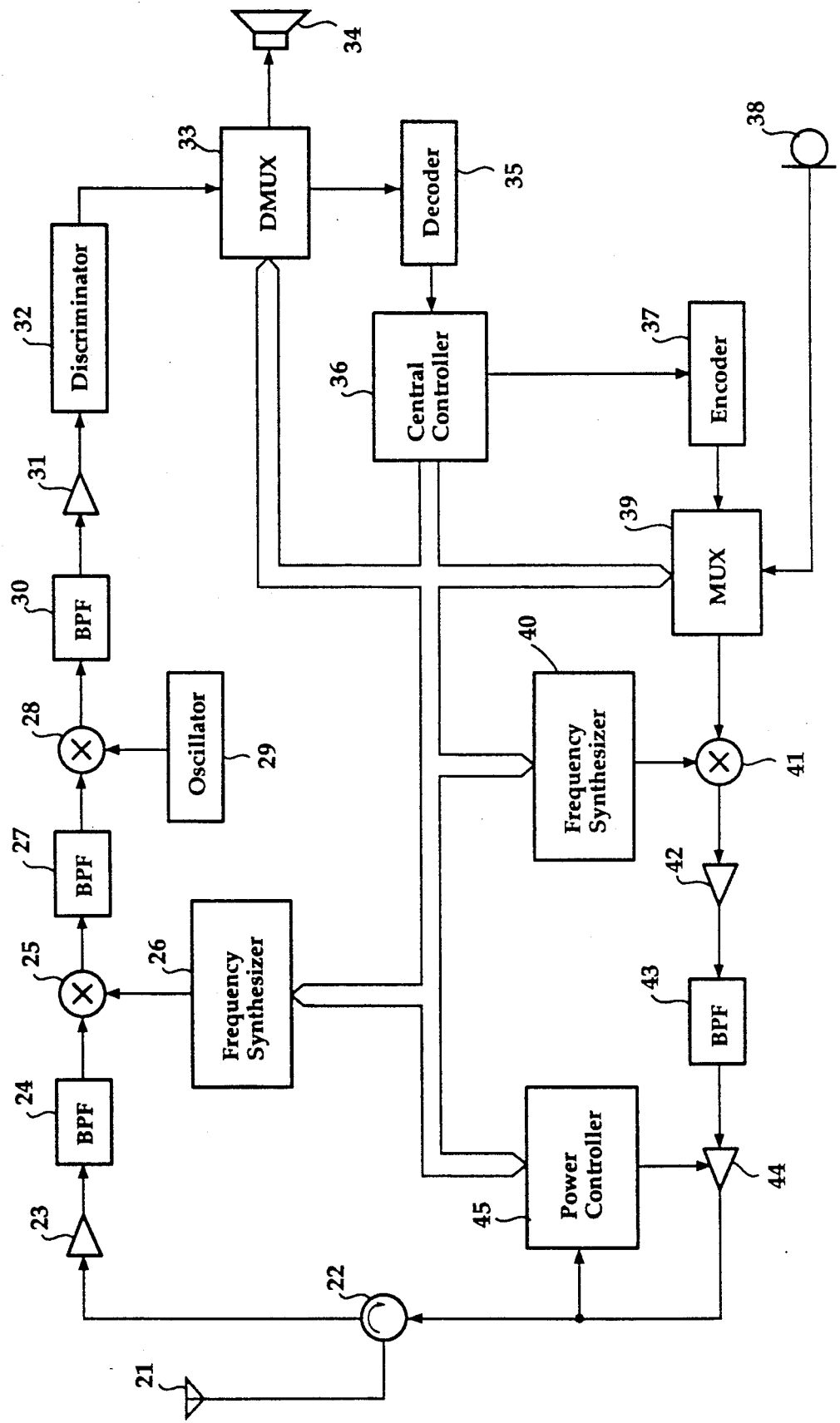
FIG. 2 is a block diagram of a mobile station of the system of FIG. 1.

Referring now to FIG. 1, there is shown a base station (BS) of a mobile telephone system according to the present invention. The system includes a plurality of mobile stations (MS) one of which is shown in FIG. 2. Radio signals from the mobile stations are detected by base-station antenna 1 and passed through a duplexer 2 and a receive coupler 3 to n receive channels each consisting of a receiver 4 and a demultiplexer 5. The signal received at the input of each receiver 4 is frequency-demodulated into a baseband signal and then demultiplexed by the associated demultiplexer 5 into a speech signal and a switching control signal. The speech and control signals are respectively supplied to a receive interface 6 and a decoder 7. Decoder 7 analyzes the switching control signal and supplies a decoded signal to a controller 8 to permit it to control the interface 6 for setting up an up-direction (MS-to-BS) speech path of a full-duplex circuit through a telephone switching system 9 which forms a part of the public telephone network.

A down-direction (BS-to-MS) speech path of the full-duplex circuit is established to a mobile station from the telephone switching system 9 through a transmit interface 10 which cooperates with the controller 8 to send a necessary control signal from an encoder 11. This control signal is multiplexed with speech signal from the telephone switching system 9 by one of multiplexers 12-1 through 12-n which is selected. The multiplexed signals are modulated upon a carrier by one of transmitters 13-1 through 13-n which is associated with the selected multiplexer and passed through a transmit coupler 14 and duplexer 2 to antenna 1 for transmission to the mobile station.

The control signal to a mobile station comprises channel number information indicating the selected calling channel, a prefix that indicates the status of the channel (call or standby), a traffic area number indicating the base station identification, a 6-digit mobile subscriber identification number, and a four-digit idle field. If the control signal is "a call to mobile station", controller 8 requests the called station to return an acknowledgment response within a specified period of time, typically 30 milliseconds, from the reception of the 6th digit of the identification number of the called station. If controller 8 fails to detect a response within the specified period, the called station is recognized as being inaccessible and the call is abandoned.

Referring to FIG. 2, a radio signal from the base station is detected by antenna 21 and passed through duplexer 22 to a high-frequency amplifier 23. After amplification, the radio signal is passed through a band-pass filter 24 to a first mixer 25 where it is frequency-demodulated to a first intermediate frequency signal with a carrier supplied from a local frequency synthesizer 26. The output of mixer 25 is passed through a band-pass filter 27 to a second mixer 28 where the first IF signal is frequency-demodulated with a carrier supplied from a oscillator 29 into a second IF signal, which is band-limited by a band-pass filter 30, amplified to a constant high amplitude level by a limiter amplifier 31, and supplied to a frequency discriminator 32. FM detection is provided by the discriminator 32 to recover the original baseband signal.

A demultiplexer 33 separates the baseband signal into speech and control signals and couples these signals to a loudspeaker 34 and a decoder 35, respectively, in response to a control signal from a central controller 36. The control signal is analyzed by the decoder 35 and fed to the central controller 36. Frequency synthesizer 26 is controlled by the controller 36 to tune to the frequency of the calling channel selected by the station.

Speech signal from a microphone 38 is applied to a multiplexer 39 which combines it in response to a signal from the central controller 36 with a control signal supplied from an encoder 37. If a call is originated from a mobile station or received from the base station, central controller 36 cooperates with the encoder 37 to generate an appropriate control signal by including in it the 6-digit mobile station ID number. The output of multiplexer 39 is fed to a mixer 41 where it is frequency-modulated upon a carrier supplied from a frequency synthesizer 40 which is also controlled by central controller 36. The output of mixer 41 is amplified by a high-frequency amplifier 42 and band-limited by a band-pass filter 43 and fed to a power amplifier 44 where it is amplified to a required level and applied through duplexer 22 to antenna 21. A power controller 45 is connected to the output of power amplifier 44 to control the output of amplifier 44 at a constant power level.

According to the present invention, central controller 36 further provides power on-off control for power savings purpose by deactivating the frequency synthesizer 40 and power amplifier 44 during standby periods in a manner as will be described hereinbelow.

Figure 3:
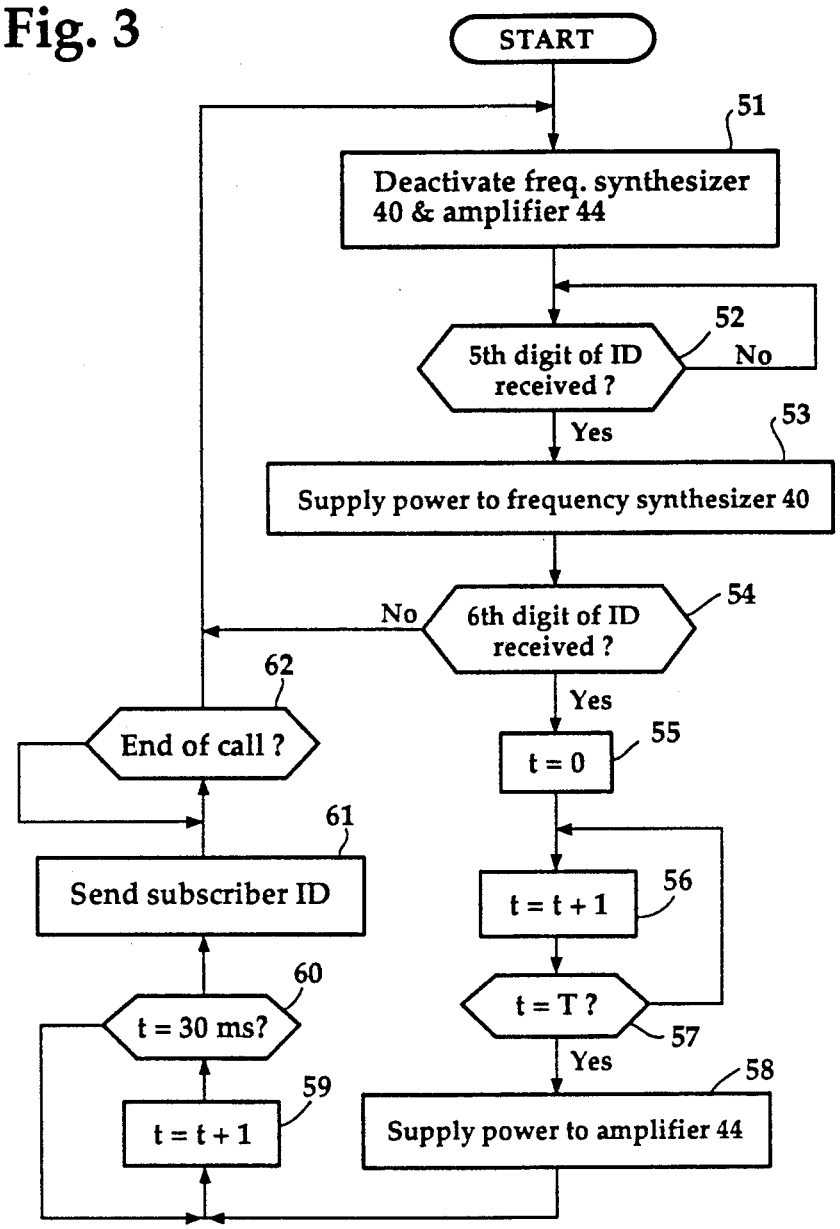
FIG. 3 is a flowchart describing a sequence of operations performed by the central controller of the mobile station.
Figure 4:
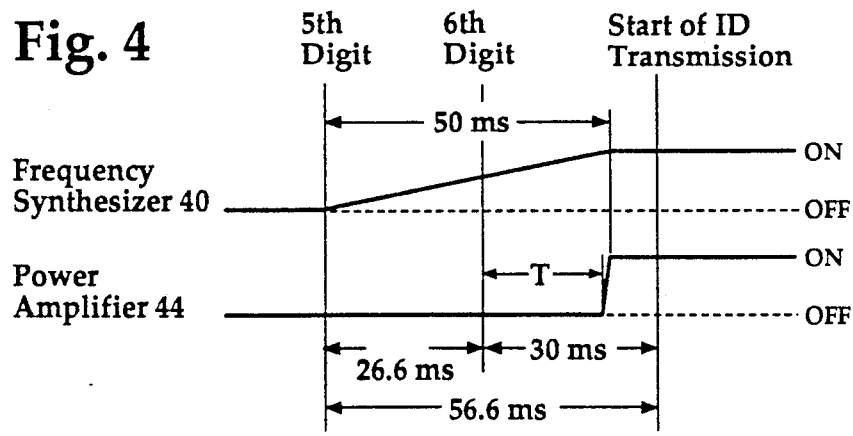
FIG. 4 is a timing diagram associated with the transmit synthesizer and the power amplifier of FIG. 2 for power savings operation.

As shown in FIG. 3, the central controller 36 programmed to provide power savings operation. The program starts with operations block 51 by causing demultiplexer 33 to couple the output of discriminator 32 to decoder 35, multiplexer 39 to couple the output of encoder 37 to mixer 41 and frequency synthesizer 26 to be tuned to the calling channel, and turning off power supplies to the frequency synthesizer 40 and power amplifier 44 through controller 45. In this way, the mobile station is in a standby state ready to receive a calling signal transmitted on the calling channel from the base station. Exit then is to decision block 52 which determines if the 5th digit of the mobile station ID number is received or not. If it is, control determines that ther is a possibility of the need to return an acknowledgment response and exits to operations block 53 to activate the frequency synthesizer 40. Frequency synthesizer 40 takes 50 milliseconds to stabilize the oscillation of the required frequency it generates as shown in FIG. 4. Exit then is to decision block 54 which checks to see if the 6th digit of the station ID number is received. If the answer is affirmative, control recognizes that the received signal is a call destined to the mobile station and proceeds to block 55 to introduce a delay time T by resetting the count (t) of a timer to zero and goes to block 56 to increment it by a unit value. Blocks 55 and 56 are repeated until the count "t" is equal to a predetermined value T which is smaller than a value corresponding to 30 milliseconds.

If the answer is negative in decision block 54, control returns to block 51 to deactivate the frequency synthesizer 40, recognizing that the call is destined to another mobile station.

When time interval T has elapsed from the reception of the 6th digit, control exits to operations block 58 to activate the power amplifier 44 by directing the power controller 45 to turn on its power supply.

Control then advances to operations block 59 to increment the count (t) by a unit value and goes to decision block 60 to check to see if count (t) is equal to a value corresponding to the 30-ms response time specified by the base station. If the response time has elapsed, control proceeds to block 61 to allow encoder 37 to generate and transmit the mobile station's ID number as an acknowledgment response.

As shown in FIG. 4, there is a time interval of 26.6 milliseconds between the 5th and 6th digits. A total of 56.6 milliseconds is therefore allowed for the frequency synthesizer 40 to stabilize its oscillation. Power amplifier 44 can reach its steady state within a period of only 1 millisecond. Loss of power can be minimized by suitably selecting the delay interval T so that the activation of the power amplifier 44 coincides with the stabilization of the synthesizer 40. Following the transmission of the mobile station's ID, the mobile station receives a channel allocation signal on the calling channel from the base station. When this signal is received, controller 36 sets the frequency synthesizer 26 and 40 to the respectively allocated channels in order to receive protocols from the switched telephone network via the base station and returns a necessary protocol to establish a connection. After establishing the connection, the controller 36 causes demultiplexer 32 to couple the output of discriminator 32 to loudspeaker 34 and multiplexer 38 to couple the output of microphone 38 to mixer 41. The mobile station is now in a talking mode.

Control then exits to decision block 62 to determine if the call is terminated, and if it is, control recognizes that the mobile station enters a standby state and returns to block 51 to deactivate the frequency synthesizer 40 and power amplifier 44.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A mobile station for exchanging signals with a base station which requests an acknowledgment to be returned from the mobile station within a specified period of time from reception of a signal from the base station, comprising:

receiver means for receiving a signal from said base station;

transmitter means for transmitting signals to said base station; and control means coupled to said transmitter means for deactivating said transmitter means during a standby mode of said mobile station to save power consumption, said control means being further coupled to said receiver means for determining from an earlier portion of a signal received by said receiver means that there is a likelihood of a need to return said acknowledgement and supplying power to said transmitter means in advance and determining from a later portion of said received signal whether said need actually exists or not, and causing said transmitter means to transmit said acknowledgment if the determination from the later portion indicates the presence of said need or deactivating said transmitter means again if the determination from the later portion indicates the absence of said need.

2. A mobile station as claimed in claim 1, wherein said transmitter means comprises frequency synthesizer means for generating a carrier, means for modulating a signal to be transmitted to said base station upon said carrier, and a power amplifier for amplifying the modulated carrier for transmission to said base station, said frequency synthesizer means having a longer warm-up time than said specified period to stabilize the frequency of said carrier, wherein said control means supplies power to said frequency synthesizer means when the determination from said earlier portion indicates the presence of said likelihood, and supplies power to said power amplifier if the determination from said later portion indicates the presence of said need and deactivating said frequency synthesizer means if the determination from said later portion indicates the absence of said need.

3. A mobile station as claimed in claim 2, wherein said earlier and later portions of said received signal are earlier and last digits, respectively, of a subscriber identification number assigned to said mobile station.

4. A mobile station as claimed 2, wherein said control means supplies power to the power amplifier so that the power amplifier is activated sufficiently for amplification at a point in time substantially coincident with the time at which the carrier generated by said frequency synthesizer means is stabilized.

* * * * *